United States Patent Office.

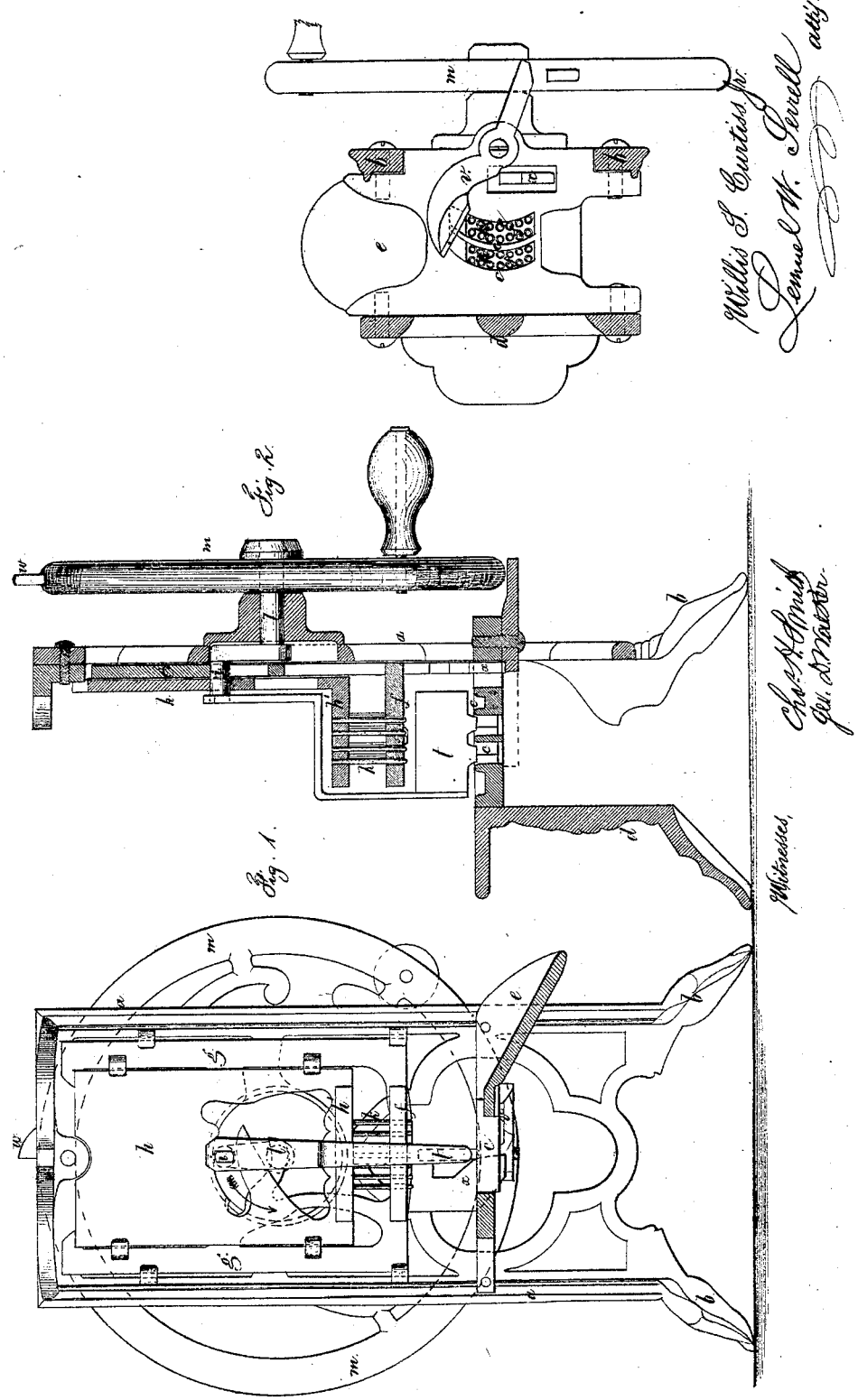

WILLIS CURTISS, JR., OF WOLCOTTVILLE, CONNECTICUT, ASSIGNOR TO ELISHA TURNER, OF SAME PLACE.

Letters Patent No. 114,417, dated May 2, 1871.

IMPROVEMENT IN RAISIN-SEEDERS.

The Schedule referred to in these Letters Patent and making part of the same.

*To all whom it may concern:*

Be it known that I, WILLIS CURTISS, Jr., of Wolcottville, in the county of Litchfield and State of Connecticut, have invented and made an Improvement in Raisin-Seeders; and the following is declared to be a correct description of the same.

This invention is for ejecting the seeds from raisins, and is an improvement upon the raisin-seeder patented November 28, 1865, No. 51,201.

My improvement relates to an arrangement of slides actuated by a crank for operating the holding-jaw and ejecting-pins, so that the raisin can be more conveniently placed in the machine; the parts are much stronger and less liable to be bent than in the machine patented as aforesaid, and the raisin is delivered by a revolving sweep acting above the grating that supports the raisin, while the seeds are removed from the ejectors by a swinging scraper.

In the drawing—

Figure 1 is an elevation with the bed in section;
Figure 2 is a vertical transverse section; and
Figure 3 is an inverted plan with the legs removed.

The vertical frame $a$ is supported upon the feet $b$, and from the side thereof the bed $c$ or grating, upon which the raisin is placed, projects and is provided with a supporting-leg, $d$, and chute $e$.

The surface of the grating $c$ is raised above the upper end of the chute $e$ so that the raisin will not catch against the end of the openings through the bed as the said raisin is moved out of the machine by a revolving sweep, hereafter described.

The holding-jaw $f$ projects above the bed and grating $c$ from a frame, $g$, that is mounted in guides in the frame $a$ so as to be moved up and down vertically, and the slide $h$, that is mounted in guides upon the frame $g$, is made with a projecting flange, $h'$, that carries the ejecting-pins $k$, passing freely in holes in the jaw $f$.

In these slides $g$ and $h$ are cam-shaped openings through which the crank-pin $i$ passes.

This crank-pin is upon a crank that revolves in a recess in the frame $a$.

At the end of the shaft $l$ and $m$ is a fly-wheel and handle for revolving the shaft $l$ and actuating the parts of the machine.

The shapes of the transverse cam-slots or openings in the frames or slides $g\ h$ are such that the crank-pin in revolving, as indicated by the arrow, fig. 1, will lift them together, and then give a still further movement to the frame $h$, flange $h'$, and ejecting-pins $k$ to draw them up from contact with the raisin that is between the holding-jaw $f$ and grating $c$, and at this point the sweep $t$, that extends as an arm from the crank-pin $i$, passes between $f$ and $c$ and delivers the raisin into the trough $e$.

The attendant places another raisin upon the grating $c$, and the further rotation of the fly-wheel and crank brings down the holding-jaw to confine the raisin, and then the ejecting-pins $k$ are forced through such raisin and the seeds delivered through the grating $c$.

At this time the swinging scraper $v$ below the bed is actuated by a projection, $w$, upon the fly-wheel, and forces the seeds away from the ends of the ejectors, and they rise and the operations are repeated.

A cam projection, $x$, from the frame $g$, acts upon the swinging scraper as said frame $g$ rises to return the scraper to a normal position.

I claim as my invention—

1. The slides $g$ and $h$ in the frame $a$, carrying respectively the holding-jaw $f$ and ejecting-pins $k$, in combination with the grating $c$ for sustaining the raisin, as and for the purposes set forth.

2. The arrangement of the crank and pin $i$, slides $g$ and $h$, with their cam-shaped slots, and the sweep $t$ for removing the raisin, in the manner specified, whereby these parts are all actuated in proper time by one crank-pin.

3. The scraper $v$, beneath the grating $c$, and actuated by the projection $w$ upon the fly-wheel $m$ and the cam $x$, projecting from the slide $g$, as and for the purposes set forth.

Signed by me this 28th day of March, A. D. 1871.

WILLIS CURTISS, JR.

Witnesses:
F. F. FUESSENICH,
CHAS. McNEIL.